(12) United States Patent
Burns et al.

(10) Patent No.: US 12,730,265 B2
(45) Date of Patent: Sep. 8, 2026

(54) SURFACE RELIEF GRATING PERFORMANCE AND COST ENHANCEMENTS FOR AUGMENTED REALITY APPLICATIONS

(71) Applicant: Tokyo Electron Limited, Tokyo (JP)

(72) Inventors: Ryan Burns, Austin, TX (US); Michael Carcasi, Austin, TX (US); Robert Brandt, Albany, NY (US)

(73) Assignee: Tokyo Electron Limited, Tokyo (JP)

( * ) Notice: Subject to any disclaimer, the term of this patent is extended or adjusted under 35 U.S.C. 154(b) by 268 days.

(21) Appl. No.: 18/475,944

(22) Filed: Sep. 27, 2023

(65) Prior Publication Data

US 2025/0102738 A1 Mar. 27, 2025

(51) Int. Cl.
*G02B 6/34* (2006.01)
*G02B 27/01* (2006.01)

(52) U.S. Cl.
CPC .......... *G02B 6/34* (2013.01); *G02B 27/0172* (2013.01); *G02B 2027/0178* (2013.01)

(58) Field of Classification Search
CPC .................. G02B 6/34; G02B 27/0172; G02B 2027/0178
See application file for complete search history.

(56) References Cited

U.S. PATENT DOCUMENTS 9,632,312 B1 * 4/2017 Cakmakci .......... G02B 27/0172
10,267,970 B2 4/2019 Jones, Jr. et al.
10,338,466 B2 7/2019 Devilliers
10,444,419 B2 10/2019 Bhargava et al.
10,451,799 B2 10/2019 Klug et al.
10,481,317 B2 11/2019 Peroz et al.
10,627,559 B2 4/2020 Curtis et al.
10,642,039 B2 * 5/2020 Simmonds ......... G02B 27/0172
10,725,223 B2 7/2020 Schowengerdt et al.
10,823,887 B1 * 11/2020 Calafiore ............ G02B 6/0016
10,823,894 B2 11/2020 Peroz et al.
10,895,671 B1 * 1/2021 Calafiore ............ H01J 37/3171
10,983,257 B1 * 4/2021 Colburn ........... B29D 11/00769
(Continued)

FOREIGN PATENT DOCUMENTS

CN 114144710 A * 3/2022 ......... G02B 27/0081
KR 10-2019-0039801 A 4/2019
(Continued)

OTHER PUBLICATIONS

English Language Text of CN-114144710-A (Year: 2022).*
(Continued)

*Primary Examiner* — Peter Radkowski
(74) *Attorney, Agent, or Firm* — Oblon, McClelland, Maier & Neustadt, L.L.P.

(57) ABSTRACT

Aspects of the present disclosure provide a method for fabricating a grating coupler. For example, the method can include providing a substrate, forming a plurality of grating elements and a photosensitive material above the substrate, and projecting actinic radiation of varied intensities to expose different regions of the photosensitive material, causing the photosensitive material to generate a solubility-changing agent. The method can also include removing the solubility-changing agent. The actinic radiation of varied intensities can correspond to depths of grooves between the grating elements.

3 Claims, 8 Drawing Sheets

(56) References Cited

U.S. PATENT DOCUMENTS 10,983,263 B2 4/2021 Kleinman et al.
10,996,382 B1 * 5/2021 Calafiore .............. G03F 7/2022
11,204,462 B2 12/2021 Klug et al.
11,428,859 B2 8/2022 Curtis et al.
11,513,268 B2 11/2022 Rahomäki et al.
11,604,310 B2 3/2023 Schowengerdt et al.
11,662,584 B2 5/2023 Lee et al.
11,733,456 B2 8/2023 Klug et al.
11,789,186 B1 * 10/2023 Calafiore ........... G02B 27/0172 29/428
11,822,112 B2 11/2023 Curtis et al.
2004/0223693 A1 * 11/2004 Wang ..................... G02B 6/124 385/37
2012/0120493 A1 * 5/2012 Simmonds ......... G02B 27/0172 359/566
2016/0033784 A1 * 2/2016 Levola ............... G02B 27/4205 385/37
2018/0095201 A1 * 4/2018 Melli ................. G02B 27/0172
2020/0225482 A1 * 7/2020 Bodiya .............. G02B 27/0172
2021/0199971 A1 * 7/2021 Lee .................... G02B 27/0172
2021/0382212 A1 * 12/2021 Sell ...................... G02B 5/1857
2022/0082739 A1 3/2022 Franke et al.
2022/0082936 A1 * 3/2022 Franke .................. G03F 7/0005
2022/0171105 A1 * 6/2022 Ko ........................ G03F 7/0007
2023/0129889 A1 4/2023 Schowendgerdt et al.
2023/0417986 A1 12/2023 Klug et al.
2024/0012190 A1 1/2024 Curtis et al.

FOREIGN PATENT DOCUMENTS

KR 10-2023-0016014 A 1/2023
KR 10-2023-0066576 A 5/2023
WO WO-2018220266 A1 * 12/2018 ......... G02B 27/0172

OTHER PUBLICATIONS

English Language Text of WO-2018220266-A1 (Year: 2018).*

International Search Report and Written Opinion issued on Dec. 18, 2024 in PCT/US2024/045870, 12 pages.

Kress et al. ; Holographic optics in planar optical systems for next generation small form factor mixed reality headsets ; Light: Advanced Manufacturing 3:42 (2022) ; 31 Pages.

Kun Li ; Understanding Wavehuide: the Key Technology for Augmented Reality Near-eye Display (Part II) ; Rokid AR/VR Journey: Augmented & Virtual Reality Magazine ; Sep. 23, 2019 ; 22 Pages.

* cited by examiner 400
410
411
420
421
480
481
490

SURFACE RELIEF GRATING PERFORMANCE AND COST ENHANCEMENTS FOR AUGMENTED REALITY APPLICATIONS

FIELD OF THE PRESENT DISCLOSURE

The present disclosure relates generally to augmented reality (AR) applications, and, in particular, to optical waveguides and methods for fabricating expansion gratings for AR applications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Aspects of the present disclosure provide an optical waveguide. For example, the optical waveguide can include a waveguide substrate, an input grating coupler configured to couple light to propagate along a total internal reflection (TIR) path in the waveguide substrate, and an expansion grating coupler configured to expand the light that propagates in the waveguide substrate. In an embodiment, at least one of the input grating coupler and the expansion grating coupler can includes one or more variable index grating elements.

In an embodiment, the variable index grating elements can be formed vertically on a surface of the waveguide substrate. For example, each of the variable index grating elements can have a variable index that is decreased linearly toward the surface of the waveguide substrate. As another example, each of the variable index grating elements can have a variable index that is decreased exponentially toward the surface of the waveguide substrate. As yet another example, each of the variable index grating elements can have a variable index that is decreased stepwise toward the surface of the waveguide substrate. In another embodiment, the variable index grating elements can be formed in a constant pitch structure.

Aspects of the present disclosure also provide a method, which can include the following steps of: (a) providing a substrate; (b) forming a plurality of grating elements and a photosensitive material above the substrate; (c) projecting actinic radiation of varied intensities to expose different regions of the photosensitive material, causing the photosensitive material to generate a solubility-changing agent; and (d) removing portions the photosensitive material having undergone a solubility change. In an embodiment, the actinic radiation of varied intensities can correspond to depths of grooves between the grating elements.

In an embodiment, steps (b) to (d) can include: forming the grating elements on the substrate; forming a developable material onto the substrate to fill the grooves between the grating elements, the developable material having a solubility that changes in response to presence of a solubility-changing agent; forming the photosensitive material to cover the developable material filled in the grooves between the grating elements, the photosensitive material generating the solubility-changing agent in response to exposure of the actinic radiation of varied intensities; projecting the actinic radiation of varied intensities to expose different regions of the photosensitive material, causing the photosensitive material to generate the solubility-changing agent, different regions of the solubility-changing agent having varied concentrations that correspond to the actinic radiation of varied intensities projected onto the different regions of the photosensitive material; causing the different regions of the solubility-changing agent to diffuse into corresponding underlying regions of the developable material at varied diffusion depths such that the solubility-changing agent changes a solubility of a top portion of the developable material, the varied diffusion depths corresponding to the varied concentrations of the different regions of the solubility-changing agent; and removing portions of the developable material having undergone a solubility change, wherein the actinic radiation of varied intensities can correspond to heights of the developable material remained in the grooves between the grating elements. For example, the different regions of the solubility-changing agent can be caused to diffuse into the corresponding underlying regions of the developable material by application of heat. As another example, the grating elements can be of equal heights.

In another embodiment, steps of (b) to (d) can include: forming on the substrate a refraction film that is to be formed as the grating elements; forming a plurality of dummy grating elements on the refraction film, the dummy grating elements corresponding to the grating elements; forming the photosensitive material to fill grooves between the dummy grating elements; projecting the actinic radiation of varied intensities, causing the photosensitive material to generate a solubility-changing agent, different regions of the solubility-changing agent having varied concentrations that correspond to the actinic radiation of varied intensities projected onto the different regions of the photosensitive material; removing portions of the photosensitive material having undergone a solubility change, with a remaining portion of the photosensitive material that is remained filled in the grooves; removing the remaining portion of the photosensitive material and a portion of the refraction film formed under the remaining portion of the photosensitive material filled in the grooves; and removing the dummy grating elements.

In some embodiments, steps (b) to (d) can include: forming on the substrate a refraction film that is to be formed as the grating element; forming the photosensitive material on the refraction film; projecting the actinic radiation of varied intensities to expose different regions of the photosensitive material, causing the photosensitive material to generate a solubility-changing agent, different regions of the solubility-changing agent having varied concentrations that correspond to the actinic radiation of varied intensities projected onto the different regions of the photosensitive material; removing portions of the photosensitive material having undergone a solubility change, with a remaining portion of the photosensitive material remaining; forming a plurality of dummy grating elements on the remaining portion of the photosensitive material; removing a portion of the remaining portion of the photosensitive material along grooves between the dummy grating elements and a portion of the refraction film under the portion of the photosensitive material; and removing the dummy grating elements and another portion of the remaining portion of the photosensitive material under the dummy grating elements. In an embodiment, the viscous material can be a polymer.

In an embodiment, the solubility-changing agent can be removed by a wet chemical process. In another embodiment, the solubility-changing agent can be removed by a dry chemical process. For example, the dry chemical process can be a reactive ion etching (RIE) process.

Aspects of the present disclosure further provide a method, which can include: providing a substrate; forming a plurality of grating elements on the substrate; forming a sacrificial structure besides at least one lateral side of the grating elements; and spin-coating a material over the sacrificial structure such that the material flows across and fill grooves between the grating elements and the viscous material filled in the grooves have varied heights.

In an embodiment, the sacrificial structure can be formed besides one lateral side of the grating elements. In another embodiment, the sacrificial structure can be formed besides two lateral sides of the grating elements. For example, the two lateral sides can be perpendicular to each other.

Of course, the order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present disclosure can be embodied and viewed in many different ways.

Note that this summary section does not specify every embodiment and/or incrementally novel aspect of the present disclosure or claimed disclosure. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

The market for augmented reality (AR) devices is rapidly growing. AR devices can be applied to military application, surgical/medical, manufacturing-real time global feedback, and general consumer applications, e.g., navigation, health/exercise, language translation, gaming, communication, etc. AR devices, e.g., head-mounted display (HMD) and near-eye display (NED), use see-through glasses to offer the most effective and immersive AR experience. Optical waveguides can be fabricated to be very thin and light, and thus can be considered to be the best choice for consumer-grade AR glasses.

An optical waveguide can guide a light wave from a light source (e.g., a display) to an eyebox (e.g., a user's eyes). A variety of optical waveguides are used in industry. A holographic waveguide can use optical elements like lenses to in-couple (entry) and out-couple (exit) light through a series of internal reflections. A reflective waveguide can use a single planar light guide and one or more semi-reflective mirrors to in-couple and out-couple light through a series of internal reflections. A polarized waveguide can use a partially reflective polarized surface to guide light to propagate along a series of internal reflection paths. A diffractive waveguide with surface relief gratings can couple light to propagate along a total internal reflection (TIR) path in the waveguide and expand and extract the light from the waveguide.

Figure 1:
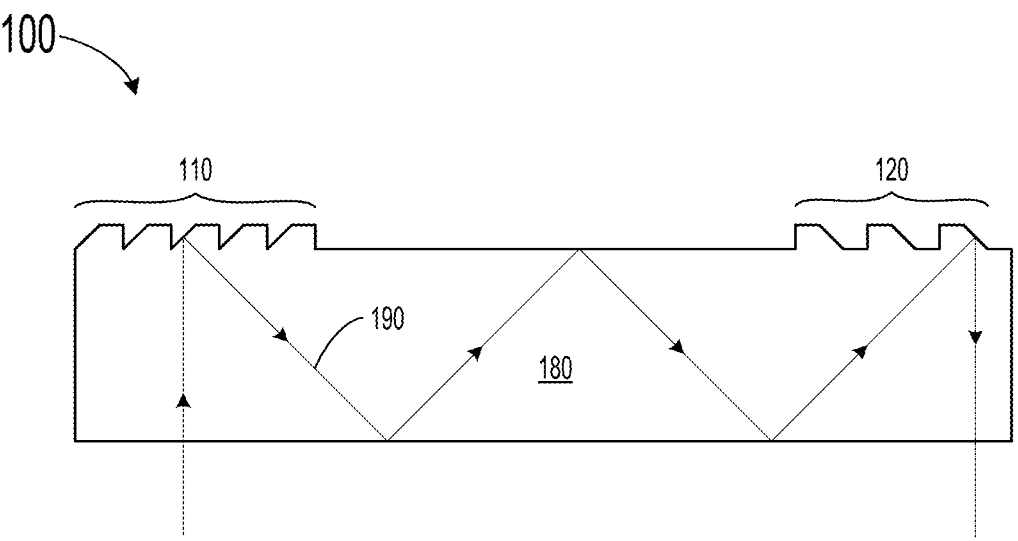
FIG. 1 is a schematic diagram of a one-dimensional diffractive optical waveguide with surface relief gratings.

FIG. 1 is a schematic diagram of a one-dimensional diffractive optical waveguide 100 with surface relief gratings. The optical waveguide 100 uses two grating elements for one-dimension (e.g., in X-direction) exit pupil expansion (1D EPE). In an embodiment, the optical waveguide 100 can include an input grating coupler (or an in-coupling region) 110, an output grating coupler (or an out-coupling region) 120 and a waveguide substrate (or a TIR region) 180. For example, the waveguide substrate 180 can be transparent. In an embodiment, the input grating coupler 110 can couple light emitted from a light source (e.g., a display) to propagate along a TIR path 190 in the waveguide substrate 180, and the output grating coupler 120 can expand and couple, out of the waveguide substrate 180, the light to a user's eyes. Each of the input grating coupler 110 and the output grating coupler 120 can have a periodic structure. For example, the periodicity of the periodic structure can be represented by embossed peaks and valleys on the surface of the waveguide substrate 180. In an embodiment, the period of the periodic structure needs to be close to or smaller than the wavelength of the light (e.g., visible range 450-750 nm). Every time the light encounters the output grating coupler 120, part of the light will be diffracted out of the optical waveguide 100 and released to the user's eyes. The rest of the light will continue to propagate inside the waveguide substrate 180 until it bounces off the output grating coupler 120 again.

Figure 2:
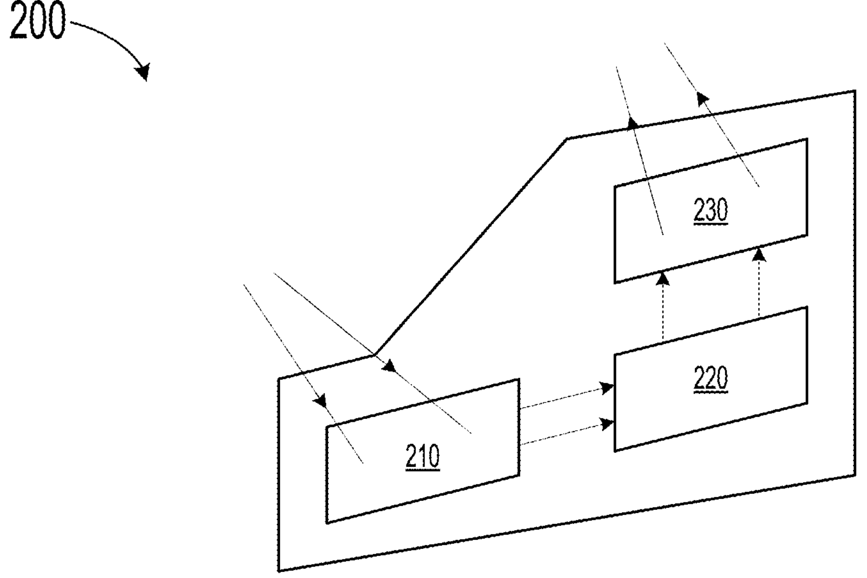
FIG. 2 is a schematic diagram of a two-dimensional diffractive optical waveguide with surface relief gratings.

FIG. 2 is a schematic diagram of a two-dimensional diffractive optical waveguide 200 with surface relief gratings. The optical waveguide 200 uses three grating elements for two-dimension (e.g., in X- and Y-directions) exit pupil expansion (2D EPE). In an embodiment, the optical waveguide 200 can include an input grating coupler 210, a fold (or turn) grating coupler 220 and an output grating coupler 230. In an embodiment, the input grating coupler 210 can couple light emitted from a light source (e.g., a display) into the optical waveguide 200 (e.g., propagating in X-direction). The light can then encounter the fold grating coupler 220, whose grating periodicity direction has an angle with respect to that of the input grating coupler 210. For example, the angle can be 45 degrees. The light will interact with the fold grating coupler 220 multiple times, while each time only part of the light is turned by 90 degrees (e.g., propagating in Y-direction), leaving the rest of the light continuing to propagate in X-direction. The light, which is expanded by the fold grating coupler 220 in X-direction, continues to encounter the output grating coupler 230. The output grating coupler 230 has a similar structure to the input grating coupler 210, although with much larger grating area and periodicity direction being perpendicular to that of the input grating coupler 210. The output grating coupler 230 can further expand the X-direction expanded light in Y-direction. Therefore, a single input pupil can be expanded by the fold grating coupler 220 into 1 by M array of pupils after 1D EPE in X-direction, and then be expanded by the output grating coupler 230 in Y-direction into an N by M matric of exit pupils.

Figures 3, 3A, 3B, 3C:
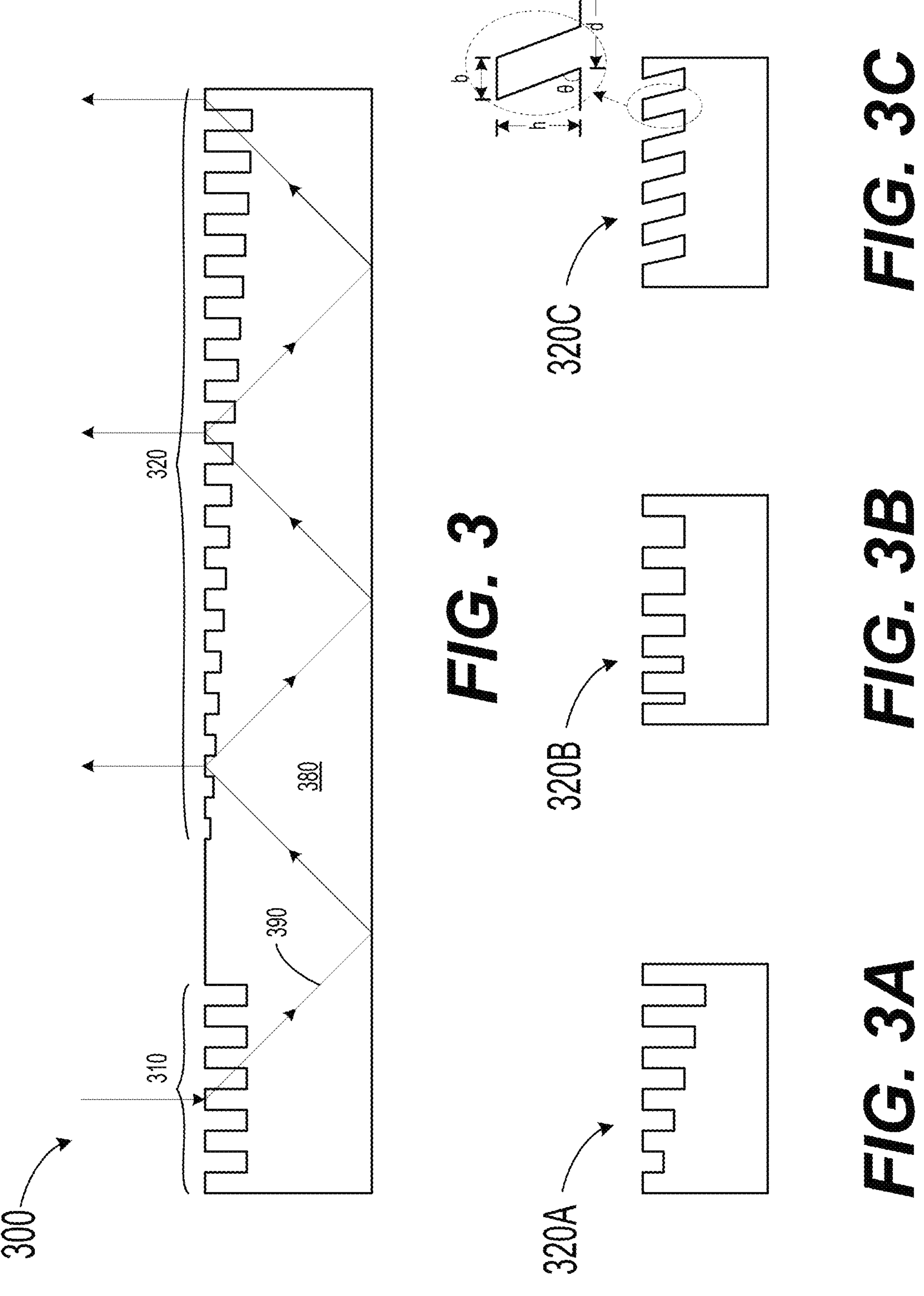
FIG. 3 is a schematic diagram of a diffractive optical waveguide with surface relief gratings.
FIGS. 3A to 3C are schematic diagrams of three different expansion grating couplers.

FIG. 3 is a schematic diagram of a diffractive optical waveguide 300 with surface relief gratings. Similar to the optical waveguide 100, the optical waveguide 300 can also include an input grating coupler 310, an output grating coupler 320 and a waveguide substrate 380. In an embodiment, the input grating coupler 310 can couple light emitted from a light source (e.g., a display) to propagate along a TIR path 390 in the waveguide substrate 380, and the output grating coupler 320 can expand and couple, out of the waveguide substrate 380, the light to a user's eyes. As the TIR region, i.e., a portion of the waveguide substrate 380 where the output grating coupler 320 is formed, gets depleted when the light gets extracted along the out-coupling region, i.e., the output grating coupler 320, the extraction efficiency of the out-coupling needs to gradually increase in the propagation direction, e.g., X-direction, to produce a uniform eyebox.

FIGS. 3A to 3C are schematic diagrams of different expansion grating couplers 320A to 320C, e.g., the output grating couplers 120, 230 and 320 and the fold grating coupler 220. The expansion grating couplers 320A to 320C can expand the field of view of the input light (from a display, for example), and modulate the output light in such a way as to keep the uniformity constant across the eyebox. The expansion grating couplers 320A to 320C can impact light uniformity over the eyebox through variation in grating (or groove) depth or grating (or ridge) height, duty cycle (or critical dimension (CD)), or slant angle. As shown in FIG. 3A, the expansion grating coupler 320A includes a plurality of grating elements (or ridges) that are different in (groove) depth or (ridge) height as light propagates down the optical waveguide 300. As shown in FIG. 3B, the expansion grating coupler 320B includes a plurality grating elements that have different grating duty cycles as light propagates down the optical waveguide 300. Grating duty cycle is defined as the ratio of the width of the grating element to the period. As shown in FIG. 3C, the expansion grating coupler 320C includes a plurality of slant grating elements, each of which is defined by slant angle θ, (ridge) width b, (ridge) height h, and grating period d. In an embodiment, the expansion grating coupler 320C can be created using nano-imprint lithography in a fairly complex, high-cost process. Innovating around lower cost methods to create such gratings is important.

Aspects of the present disclosure provide methods for creating low cost and high performance surface relief gratings for AR waveguide applications.

Figures 4, 4A, 4B, 4C:
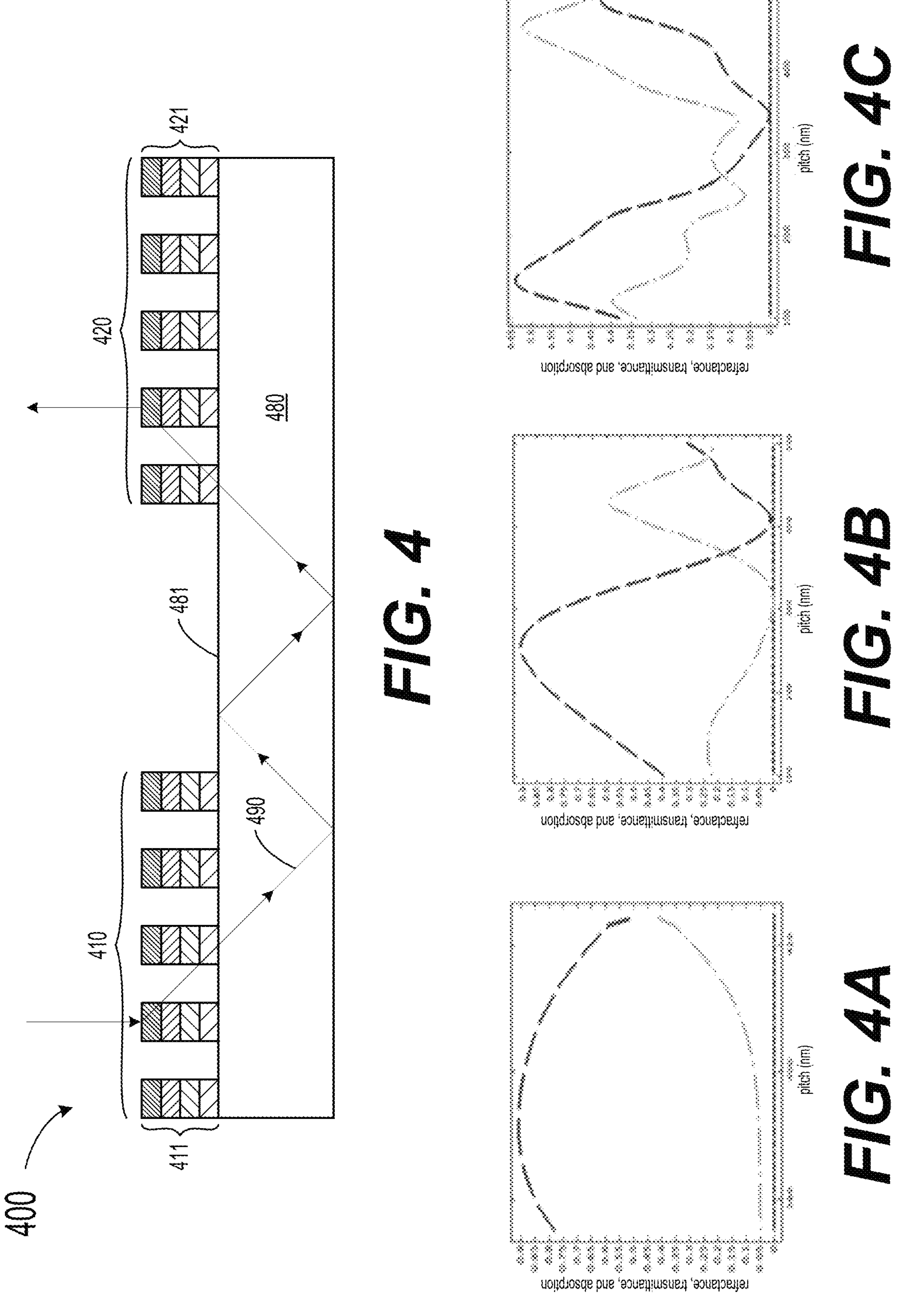
FIG. 4 is a schematic diagram of an exemplary diffractive optical waveguide according to some embodiments of the present disclosure.
FIG. 4A shows linear decreasing index of refraction (n)
FIG. 4B shows exponentially decreasing index of refraction (n)
FIG. 4C shows constant index of refraction (n)

FIG. 4 is a schematic diagram of an exemplary diffractive optical waveguide 400 according to some embodiments of the present disclosure. For example, the optical waveguide 400 can be with binary gratings. In an embodiment, the optical waveguide 400 can include an input grating coupler 410, an expansion grating coupler 420 (e.g., the output grating couplers 120, 230 and 320 and the fold grating coupler 220), and a waveguide substrate 480. For example, the waveguide substrate 480 can be transparent. In an embodiment, the input grating coupler 410 can couple light emitted from a light source (e.g., a display) to propagate along a TIR path 490 in the waveguide substrate 480, and the expansion grating coupler 420 can expand the light that propagates in the waveguide substrate 480. In another embodiment, the expansion grating coupler 420 can be an output grating coupler, and further couple, out of the waveguide substrate 480, the light to an eyebox (e.g., a user's eyes). Each of the input grating coupler 410 and the expansion grating coupler 420 can have a periodic structure. For example, the periodicity of the periodic structure can be represented by embossed peaks and valleys on the surface of the waveguide substrate 480. In an embodiment, the period of the periodic structure needs to be close to or smaller than the wavelength of the light (e.g., visible range 450-750 nm). Every time the light encounters the expansion (output) grating coupler 420, part of the light will be diffracted out of the waveguide 400 and released to the user's eyes. The rest of the light will continue to propagate inside the waveguide substrate 480 until it bounces off the expansion (output) grating coupler 420 again.

In an embodiment, at least one of the input grating coupler 410 and the expansion grating coupler 420 can include one or more variable index grating elements (or ridges or films) 411/421. In an embodiment, the variable index grating elements 411/421 can be formed vertically on a (top) surface 481 of the waveguide substrate 480. In another embodiment, the variable index grating elements 411/421 can be formed in a constant pitch structure. For example, each of the variable index grating elements 411/421 can be 110 nm in width. In an embodiment, the variable index grating elements 411 of the input grating coupler 410 can be the same as the variable index grating elements 421 of the expansion grating coupler 420. In another embodiment, the variable index grating elements 411 of the input grating coupler 410 can be different from the variable index grating elements 421 of the expansion grating coupler 420.

In an embodiment, each of the variable index grating elements 411/421 can have a variable index that is decreased linearly toward the top surface 481 of the waveguide substrate 480. In another embodiment, each of the variable index grating elements 411/421 can have a variable index that is decreased exponentially toward the top surface 481 of the waveguide substrate 480. In various embodiments, each of the variable index grating elements 411/421 can have a variable index that is decreased stepwise toward the top surface 481 of the waveguide substrate 480. As shown in FIG. 4, each of the variable index grating elements 411/421 can have four different decremental indexes that range from 2.35 to 1.5. In some embodiments, each of the variable index grating elements 411/421 can have two, three or more than four different decremental indexes.

FIGS. 4A to 4C show the performance comparison, through wave optics module simulation, between a grating coupler that has constant index (e.g., 2.35) grating elements (indicated by a dotdash line) and the input grating coupler 410 (and/or the expansion grating coupler 420) (indicated by a dashed line) which has the variable index grating elements 411 (and/or variable index grating elements 421) that are decreased linearly and decreased stepwise toward the top surface 481 of the waveguide substrate 480, respectively. As shown, the first transmissive diffraction order (T1) of the input grating coupler 410 (and the expansion grating coupler 420) can achieve an efficiency of 90% after geometry optimization due to the graded index characteristics. FIG. 4A shows that a linear variation is most beneficial for efficiency as opposed to an exponential variation (FIG. 4B) or compared to a constant index of refraction (FIG. 4C).

The graded variable index grating coupler, e.g., the input grating coupler 410 and the expansion grating coupler 420, can be formed in multiple ways. In an embodiment, chemical vapor deposition can be employed to deposit the variable index grating coupler. For example, the gradient of the variable index grating coupler can be varied by adjusting the chemical or process variables during the deposition process. In another embodiment, a dielectric material such as $Si_xO_y$, the stoichiometry of the material can be varied by continuously adjust the ratio of $SiH_4$ to $N_2O$ during the deposition process, resulting in a graded variable index grating coupler. Alternative precursor gases can also be used. In various embodiments, for silicon nitride the refractive index can be varied between the range of 1.8 to 2.5 by adjusting the chemical composition of silane, ammonia, or nitrogen in a chemical vapor deposition (CVD) chamber. For example, the ratio of silane to ammonia or nitrogen can be adjusted to achieve a desired refractive index, with higher ratios of silane corresponding to larger refractive indexes.

Figure 5:
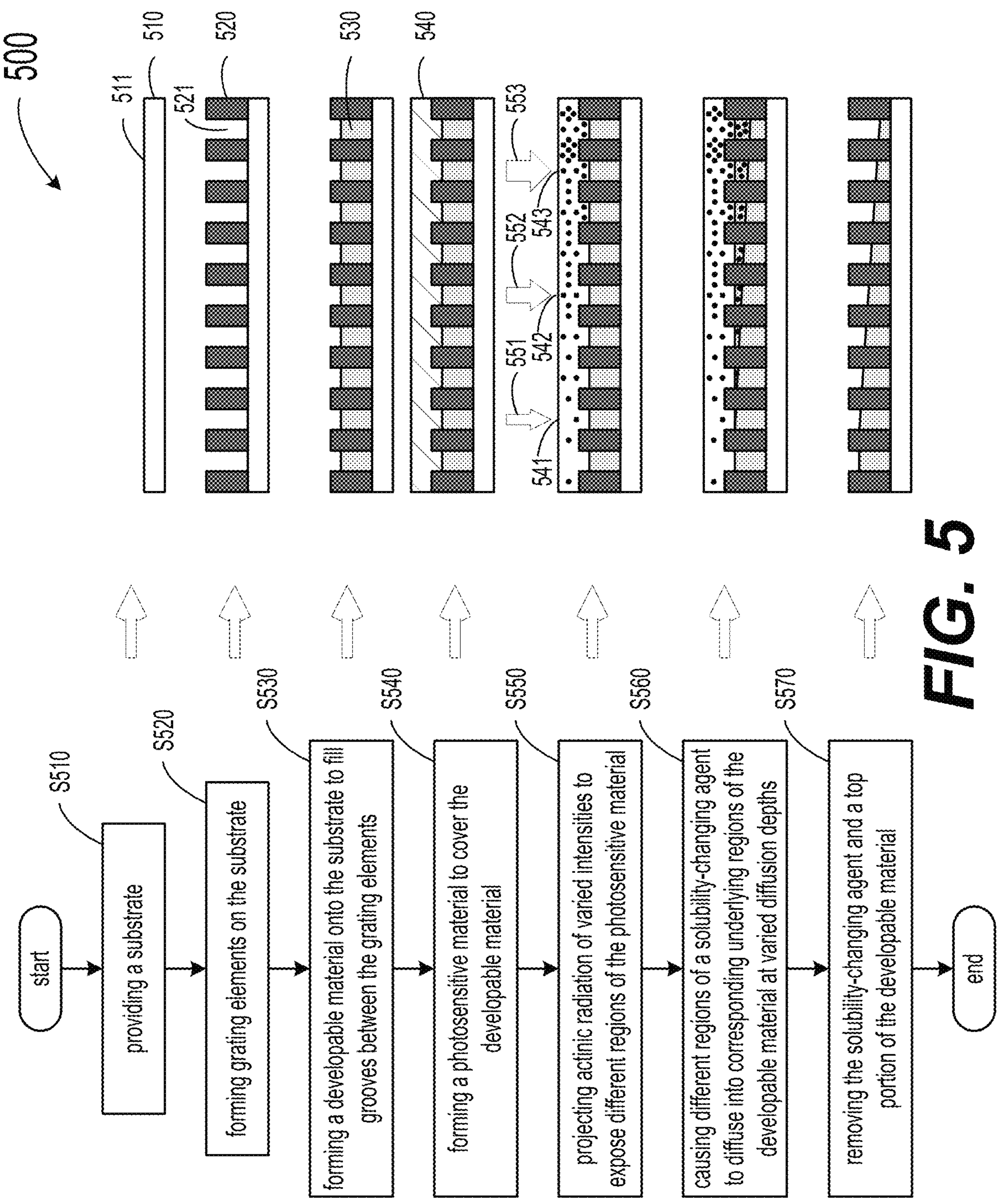
FIG. 5 is a flow chart of a first exemplary method for fabricating a grating coupler with surface relief gratings according to some embodiments of the present disclosure.

FIG. 5 is a flow chart of an exemplary method for fabricating a grating coupler 500 with surface relief gratings according to some embodiments of the present disclosure. In an embodiment, the grating coupler 500 can include a plurality of grating elements 520 that have different (ridge) heights or (groove) depths. In various embodiments, some of the steps of the method shown can be performed concurrently or in a different order than shown, can be substituted by other method steps, or can be omitted. Additional method steps can also be performed as desired. The method starts at step S510, at which a substrate 510 is provided. In an embodiment, the substrate 510 can be provided from a separate tool or from within the same tool. In an embodiment, the substrate 510 can be provided by placing the substrate 510 on a substrate holder of a process chamber. The method can then proceed to step S520.

At step S520, a grating coupler that includes a plurality of grating elements 520 can be formed on the substrate 510. In an embodiment, the grating elements 520 can be formed vertically on a (top) surface 511 of the substrate 510. In another embodiment, the grating elements can be of equal heights. The method can then proceed to step S530.

At step S530, a developable material 530 with solubility switching (or changing) characteristics can be formed on the substrate 510 to fill grooves 521 between the grating elements 520. For example, a high index resin can be deposited (e.g., spin coated) on the substrate 510 to fill the grooves 521. In the exemplary embodiment shown in FIG. 5, the developable material 530 can fill the grooves 521, without covering the grating elements 520. As another example, the developable material 530 can fill the grooves 521 and further cover at least a portion or all of the grating elements 520. In an embodiment, the developable material 530 can have a solubility that changes in response to presence of a solubility-changing agent at or above a predetermined concentration threshold. In an embodiment, the developable material 530 can include hard mask materials, anti-reflective coating materials, etc. For example, a silicon-containing developable bottom anti-reflective coating film can be deposited and formed as the developable material 530. The method can then proceed to step S540.

At step S540, a photosensitive material 540 can be formed to cover the developable material 530 filled in the grooves 521 between the grating elements 520. In the exemplary embodiment shown in FIG. 5, the photosensitive material 540 can be formed to further cover the grating elements 520. The photosensitive material 540 can include a generator compound that generates the solubility-changing agent in response to exposure of actinic radiation. For example, the generator compound can include a photo acid generator (PAG). As another example, the generator compound can include a photo base generator (PBG). In an embodiment, the generator compound can include two or more different types of PAGs. The method can then proceed to step S550.

At step S550, actinic radiation of varied intensities can be projected to expose different regions of the photosensitive material 540, causing the photosensitive material 540 to generate the solubility-changing agent. In an embodiment, the actinic radiation of varied intensities can be projected by a laser galvanometer, digital light projection (DLP) chips, grating light valves (GLVs), microelectromechanical system (MEMS) mirrors, etc. For example, actinic radiation of first to third intensities 551-553 can be projected to expose first to third regions 541-543 of the photosensitive material 540, respectively. After exposed to actinic radiation of a certain intensity, a certain region of the photosensitive material 540 generates a solubility-changing agent that has a concentration corresponding to the certain intensity. In other words, a region of the photosensitive material 540 that is exposed to more actinic radiation will in turn generate relatively more solubility-changing agent, while another region of the photosensitive material 540 that is exposed to less actinic radiation will in turn generate relatively less solubility-changing agent. In an embodiment, the third intensity 553 (indicated by a wider arrow) can be greater than the second intensity 552 (indicated by a moderate arrow), and the second intensity 552 can be greater than the first intensity 551 (indicated by a narrower arrow). As a result, a third solubility-changing agent generated within the third region 543 has a third concentration greater than a second concentration of a second solubility-changing agent generated within the second region 542, and the second concentration is greater than a first concentration of a first solubility-changing agent generated within the first region 541. As shown in FIG. 5, more dots, which represent instances of a solubility-changing agent having been generated, appear within the third region 543 than within the second region 542 than within the first region 541, and the same is true for the second region 542 compared to the first region 541. The method can then proceed to step S560.

At step S560, the different regions of the solubility-changing agent can be caused to diffuse into corresponding underlying regions of the developable material 530 at varied (vertical) diffusion depths such that the solubility-changing agent changes the solubility of a top portion of the developable material 530. In an embodiment, the varied diffusion depths correspond to the varied concentrations of the different regions of the solubility-changing agent. For example, the diffusion of the solubility-changing agent into the developable material 530 can be caused by application of heat, e.g., by baking the substrate 510. Baking the substrate 510, which has the solubility-changing agent generated on top of the developable material 530, can cause the solubility-changing agent to diffuse into the developable material 530. The varied diffusion depths of the developable material 530 can be controlled based on molecular weight of a particular developable material, baking temperature, baking time, type of developable material, etc. The method can then proceed to step S570.

At step S570, the solubility-changing agent and the top portion of the developable material 530 can be removed. In an embodiment, the solubility-changing agent and the top portion of the developable material 530 can be removed at the same step and/or using the same developing agent. For example, the solubility-changing agent and the top portion of the developable material 530 can be removed by a liquid phase chemical process or a gas phase chemical process (e.g., a reactive ion etching (RIE) process).

In an embodiment, the actinic radiation of varied intensities projected to expose the different regions of the photosensitive material 540 can be controlled (with a controlled exposure dose) based on a z-height signature that spatially characterizes z-height values of the developable material 530 remaining in the grooves 521 between the grating elements 520. As shown in FIG. 5, the actinic radiation of the first to third intensities 551-553 projected to expose the first to third regions 541-543 of the photosensitive material 540, respectively, are controlled such that the first to third solubility-changing agents generated in the first to third regions 541-543, respectively, increase gradually and the underlying regions of the developable material 530 remained in the grooves 521 that correspond to the first to third regions 541-543 have varied (ridge) heights or (groove) depths that increase gradually from the first region 541 to the third region 543.

In another embodiment, the developable material 530 could also include either a PBG or PDB (photo decomposable base). In this manner, the photoactive compound in the photosensitive material 540 could be partially quenched as it diffuses into the developable material 530, either working in a controlled fashion to enhance or diminish the desired height differential in the grating.

Figure 6:
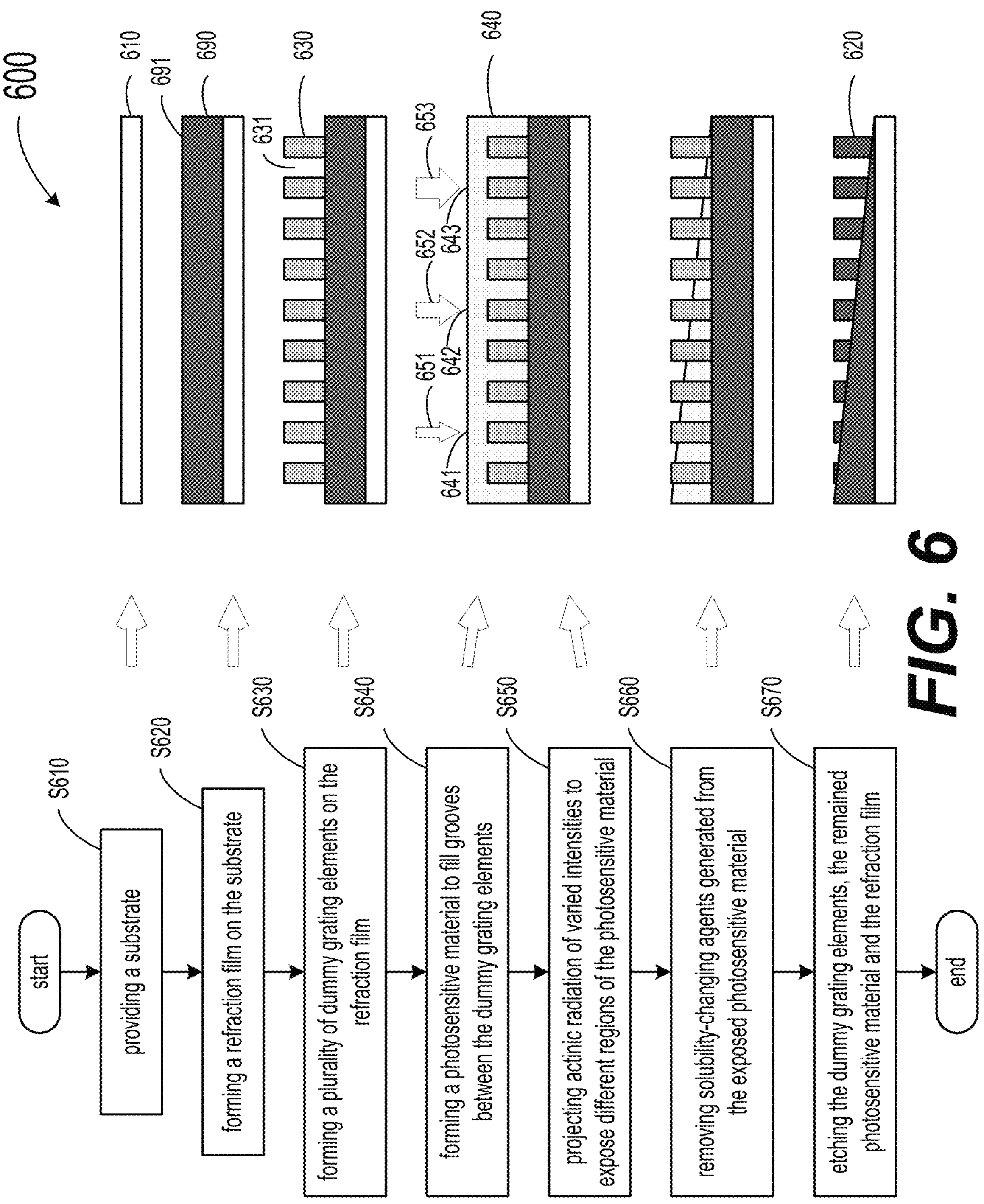
FIG. 6 is a flow chart of a second exemplary method for fabricating a grating coupler with surface relief gratings according to some embodiments of the present disclosure.

FIG. 6 is a flow chart of an exemplary method for fabricating a grating coupler 600 with surface relief gratings according to some embodiments of the present disclosure. In an embodiment, the grating coupler 600 can include a plurality of grating elements 620 that have different (ridge) heights or (groove) depths. In various embodiments, some of the steps of the method shown can be performed concurrently or in a different order than shown, can be substituted by other method steps, or can be omitted. Additional method steps can also be performed as desired. The method starts at step S610, at which a substrate 610 is provided. In an embodiment, the substrate 610 can be provided from a separate tool or from within the same tool. In an embodiment, the substrate 610 can be provided by placing the substrate 610 on a substrate holder of a process chamber. The method can then proceed to step S620.

At step S620, a (high index of) refraction film 690 (that is to be formed as the grating elements 620) can be formed on the substrate 610. The method can then proceed to step S630.

At step S630, a plurality of dummy grating elements (e.g., a binary hard mask) 630 can be formed on the refraction film 690. In an embodiment, the dummy grating elements 630 can be of equal heights. In another embodiment, the dummy grating elements 630 can be formed vertically on a (top) surface 6911 of the refraction film 690. The method can then proceed to step S640.

At step S640, a photosensitive material 640 can be formed to fill grooves 631 between the dummy grating elements 630. In the exemplary embodiment shown in FIG. 6, the photosensitive material 640 can be formed to further cover the dummy grating elements 630. The photosensitive material 640 can include a generator compound that generates the solubility-changing agent in response to exposure of actinic radiation. For example, the generator compound can include a PAG. As another example, the generator compound can include a PBG. In an embodiment, the generator compound can include two or more different types of PAGs. The method can then proceed to step S650.

At step S650, actinic radiation of varied intensities can be projected to expose different regions of the photosensitive material 640, causing the photosensitive material 640 to generate the solubility-changing agent. In an embodiment, the actinic radiation of varied intensities can be projected by a laser galvanometer, DLP chips, GLVs, MEMS mirrors, etc. For example, a gradient in actinic radiation can be represented by first to third intensities 651-653 projected to expose first to third regions 641-643 of the photosensitive material 640, respectively. In an embodiment, the third intensity 653 (indicated by a wider arrow) can be greater than the second intensity 652 (indicated by a moderate arrow), and the second intensity 652 can be greater than the first intensity 651 (indicated by a narrower arrow). As a result, a third solubility-changing agent generated within the third region 643 has a third concentration greater than a second concentration of a second solubility-changing agent generated within the second region 642, and the second concentration is greater than a first concentration of a first solubility-changing agent generated within the first region 641. The method can then proceed to step S660.

At step S660, the photosensitive material 640 with a gradient in the solubility-changing agent can be developed and removed. In an embodiment, more solubility-changing agents can be removed within the third region 643 than within the second region 642 than within the first region 641, and thus the remained photosensitive material 640 has variable heights that decrease gradually from the first region 641 to the third region 643. The method can then proceed to step S670.

At step S670, the dummy grating elements 630, the remained photosensitive material 640 and a portion of the refraction film 690 that is under the remained photosensitive material 640 filled in the grooves 631 can be etched, e.g., by RIE process, to form the grating elements 620. In an embodiment, the grating elements 620 have varied (ridge)

heights or (groove) depths that increase gradually from the first region 641 to the third region 643.

In an embodiment, the actinic radiation of varied intensities projected to expose the different regions of the photosensitive material 640 can be controlled (with a controlled exposure dose) based on a z-height signature that spatially characterizes z-height values of the refraction film 690 remained in regions corresponding to the grooves 631 between the dummy grating elements 630. As shown in FIG. 6, the actinic radiation of the first to third intensities 651-653 projected to expose the first to third regions 641-643 of the photosensitive material 640, respectively, are controlled such that the first to third solubility-changing agents generated within the first to third regions 641-643, respectively, increase gradually, and the photosensitive material 640 remained within the first to third regions 641-643 have varied (ridge) heights or (groove) depths that increase gradually from the first region 641 to the third region 643.

Figure 7:
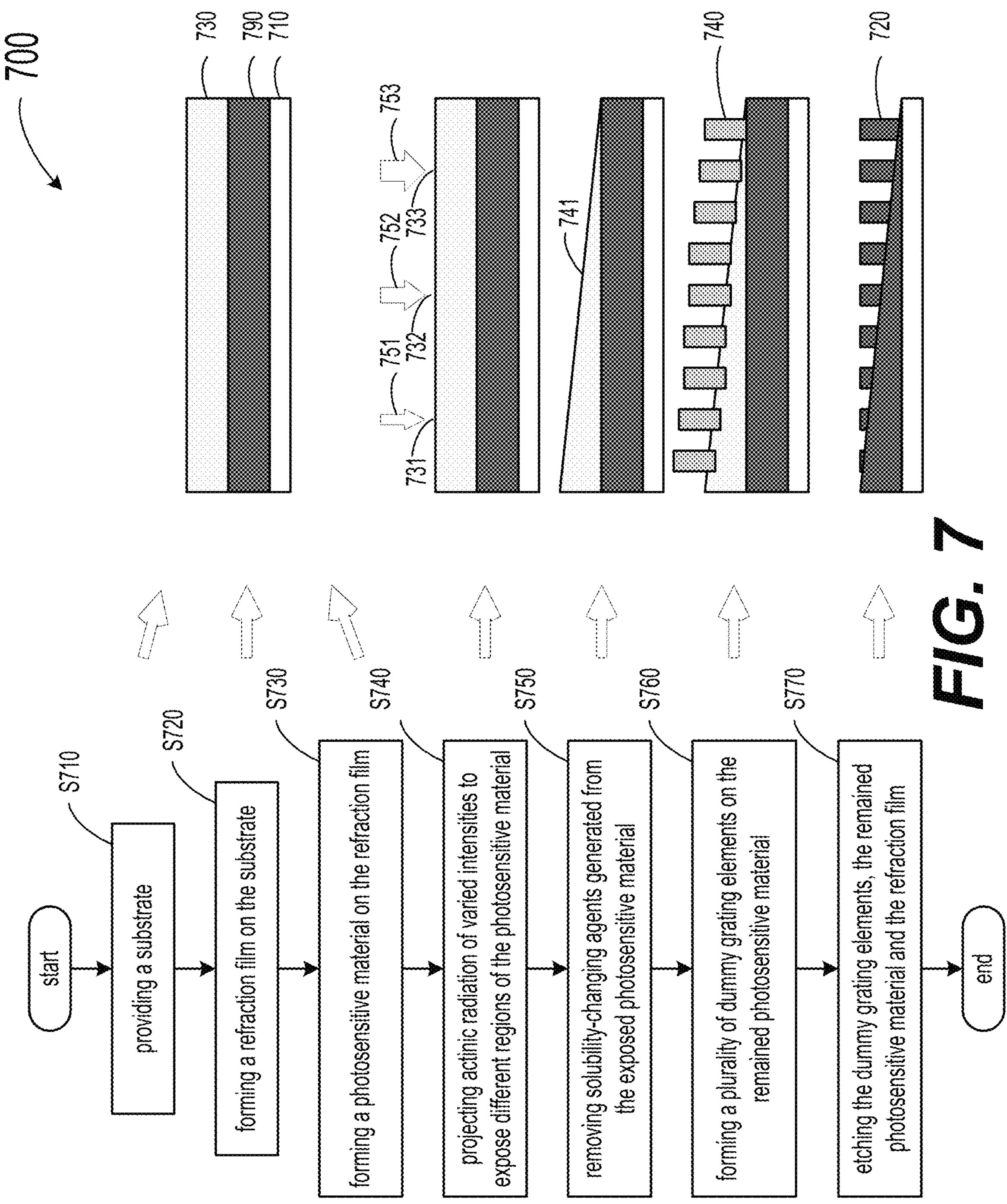
FIG. 7 is a flow chart of a third exemplary method for fabricating a grating coupler with surface relief gratings according to some embodiments of the present disclosure.

FIG. 7 is a flow chart of an exemplary method for fabricating a grating coupler 700 with surface relief gratings according to some embodiments of the present disclosure. In an embodiment, the grating coupler 700 can include a plurality of grating elements 720 that have different (ridge) heights or (groove) depths. In various embodiments, some of the steps of the method shown can be performed concurrently or in a different order than shown, can be substituted by other method steps, or can be omitted. Additional method steps can also be performed as desired. The method starts at step S710, at which a substrate 710 is provided. In an embodiment, the substrate 710 can be provided from a separate tool or from within the same tool. In an embodiment, the substrate 710 can be provided by placing the substrate 710 on a substrate holder of a process chamber. The method can then proceed to step S720.

At step S720, a (high index of) refraction film 790 (that is to be formed as the grating elements 720) is formed on the substrate 710. The method can then proceed to step S730.

At step S730, a photosensitive material 730 can be formed on the refraction film 790. The photosensitive material 730 can include a generator compound that generates the solubility-changing agent in response to exposure of actinic radiation. For example, the generator compound can include a PAG. As another example, the generator compound can include a PBG. In an embodiment, the generator compound can include two or more different types of PAGs. The method can then proceed to step S740.

At step S740, actinic radiation of varied intensities can be projected to expose different regions of the photosensitive material 730, causing the photosensitive material 730 to generate the solubility-changing agent. In an embodiment, the actinic radiation of varied intensities can be projected by a laser galvanometer, DLP chips, GLVs, MEMS mirrors, etc. For example, actinic radiation of first to third intensities 751-753 can be projected to expose first to third regions 731-733 of the photosensitive material 730, respectively. In an embodiment, the third intensity 753 (indicated by a wider arrow) can be greater than the second intensity 752 (indicated by a moderate arrow), and the second intensity 752 can be greater than the first intensity 751 (indicated by a narrower arrow). As a result, a third solubility-changing agent generated within the third region 733 has a third concentration greater than a second concentration of a second solubility-changing agent generated within the second region 732, and the second concentration is greater than a first concentration of a first solubility-changing agent generated within the first region 731. The method can then proceed to step S750.

At step S750, portions of the photosensitive material 730 having undergone a solubility-changing event by the exposure can be developed and removed. In an embodiment, more solubility-changing agents are removed within the third region 733 than within the second region 732 than within the first region 731, and thus the remained photosensitive material 730 has variable heights that decrease gradually from the first region 731 to the third region 733. The method can then proceed to step S760.

At step S760, a plurality of dummy grating elements (e.g., a binary hard mask) 740 can be formed on the remained photosensitive material 730. In an embodiment, the dummy grating elements 740 can be of equal heights. In another embodiment, the dummy grating elements 740 can be formed vertically on a (top) surface 741 of the remained photosensitive material 730. The method can then proceed to step S770.

At step S770, the dummy grating elements 740, the remained photosensitive material 730 and a portion of the refraction film 790 that is under the remained photosensitive material 730 can be etched, e.g., by RIE process, to form the grating elements 720. In an embodiment, the grating elements 720 have varied (ridge) heights or (groove) depths that increase gradually from the first region 731 to the third region 733.

Figure 8:
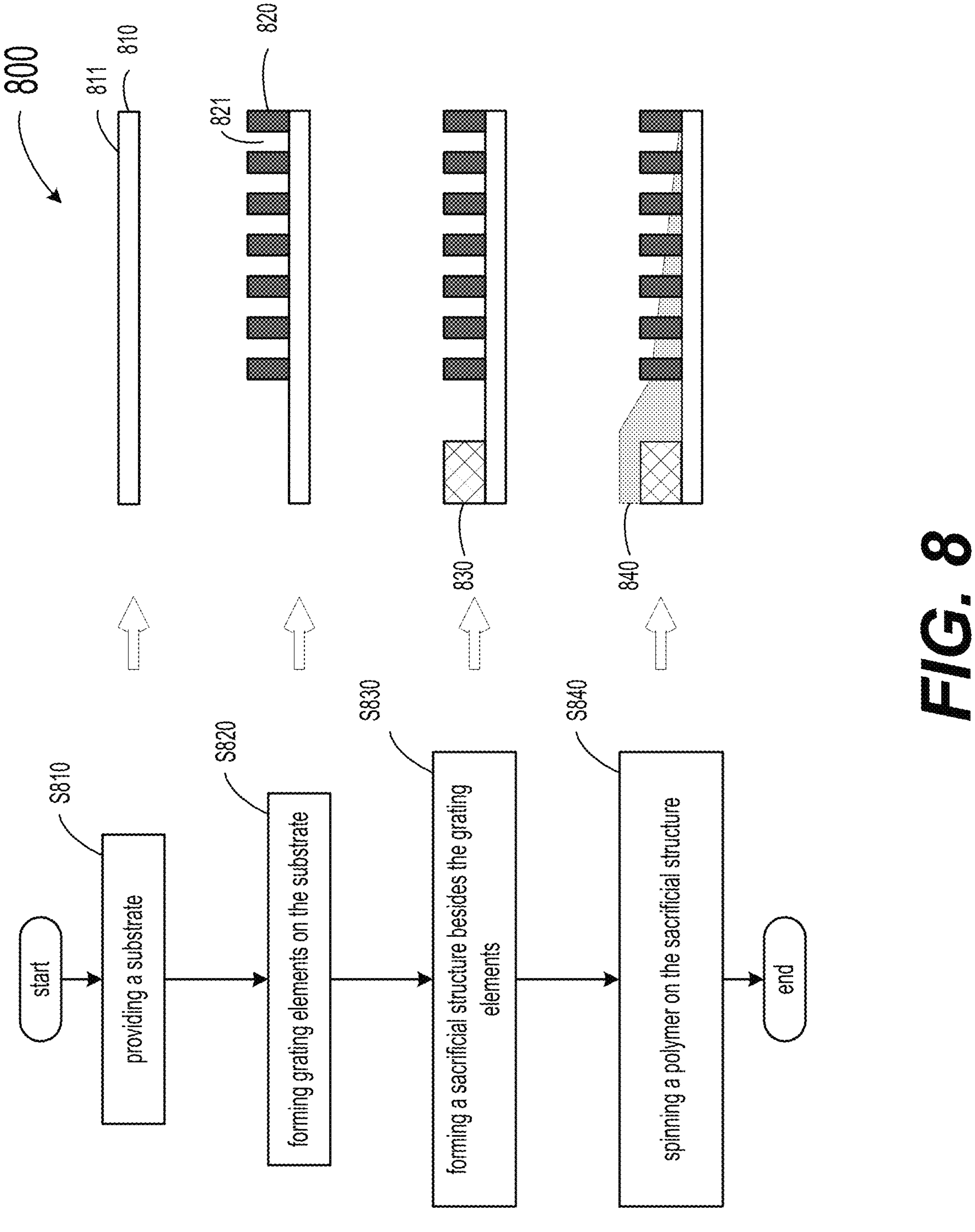
FIG. 8 is a flow chart of a fourth exemplary method for fabricating a grating coupler with surface relief gratings according to some embodiments of the present disclosure.

FIG. 8 is a flow chart of an exemplary method for fabricating a grating coupler 800 with surface relief gratings according to some embodiments of the present disclosure. In an embodiment, the grating coupler 800 can include a plurality of grating elements 820 that have different (ridge) heights or (groove) depths. In various embodiments, some of the steps of the method shown can be performed concurrently or in a different order than shown, can be substituted by other method steps, or can be omitted. Additional method steps can also be performed as desired. The method starts at step S810, at which a substrate 810 is provided. In an embodiment, the substrate 810 can be provided from a separate tool or from within the same tool. In an embodiment, the substrate 810 can be provided by placing the substrate 810 on a substrate holder of a process chamber. The method can then proceed to step S820.

At step S820, a grating coupler that includes a plurality of (binary) grating elements 820 can be formed on the substrate 810. In an embodiment, the grating elements 820 can be formed vertically on a (top) surface 811 of the substrate 810. In another embodiment, the grating elements can be of equal heights. The method can then proceed to step S830.

At step S830, a sacrificial structure 830 is formed besides at least one lateral side of the grating coupler. In an embodiment, the sacrificial structure 830 can have a greater height than the grating elements 820. In an embodiment, the sacrificial structure 830 can have an equal height to the grating elements 820. In various embodiments, the sacrificial structure 830 can have a less height than the grating elements 820. The method can then proceed to step S840.

At step S840, a material 840, e.g., a polymer, can be controlled to be spined on the sacrificial structure 830 such that the material 840 will flow across and fill grooves 821 between the grating elements 820 and the grating elements 820 can have (ridge) heights or (groove) depths that increase gradually. In an embodiment, the sacrificial structure 830 can be used to control the graded response from a spin-on material, e.g., the material 840. In another embodiment, viscosity and spinning speed of the material 840 can be controlled to result in an appropriate slanted grade of the grating elements 820. In various embodiments, the indexes of the grating elements 820 can be tuned for optical properties.

Figures 9A, 9B:
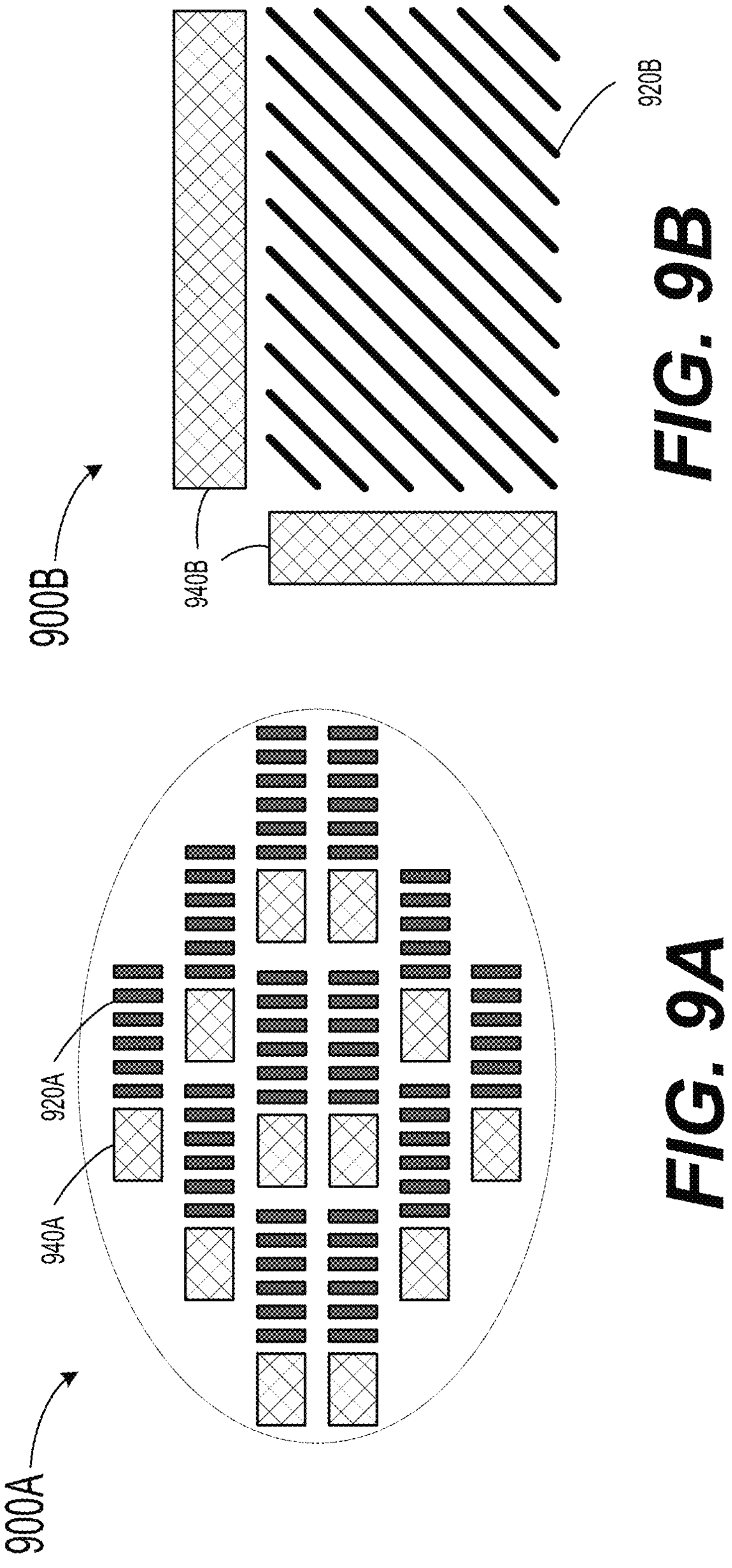
FIG. 9A is a top view of a one-dimensional sacrificial structure formed besides one lateral side of an exemplary grating coupler that includes a plurality of grating elements according to some embodiments of the present disclosure.
FIG. 9B is a top view of a two-dimensional sacrificial structure formed besides two perpendicular lateral sides of an exemplary grating coupler that includes a plurality of grating elements according to some embodiments of the present disclosure.

In an embodiment, the sacrificial structure 830 can be formed besides one lateral side of the grating coupler (one-dimensional grating case). For example, as shown in FIG. 9A (a top view), a one-dimensional sacrificial structure 940A is formed besides one lateral side of a grating coupler that includes a plurality of grating elements 920A. In another embodiment, the sacrificial structure 830 can be formed besides two (e.g., perpendicular) lateral sides of the grating coupler (two-dimensional grating case). For example, as shown in FIG. 9B (a top view), a two-dimensional sacrificial structure 940B is formed besides two perpendicular lateral sides of a grating coupler that includes a plurality of grating elements 920B.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "target substrate" as used herein generically refers to an object being processed in accordance with the present disclosure. The substrate may include any material portion or structure of a device, particularly a semiconductor or other electronics device, and may, for example, be a base substrate structure, such as a semiconductor wafer, reticle, or a layer on or overlying a base substrate structure such as a thin film. Thus, substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

Those skilled in the art will also understand that there can be many variations made to the operations of the techniques explained above while still achieving the same objectives of the present disclosure. Such variations are intended to be covered by the scope of this disclosure. As such, the foregoing descriptions of embodiments of the present disclosure are not intended to be limiting. Rather, any limitations to embodiments of the present disclosure are presented in the following claims.

What is claimed is:

1. An optical waveguide, comprising:

a waveguide substrate;

an input grating coupler configured to couple light to propagate along a total internal reflection (TIR) path in the waveguide substrate; and an expansion grating coupler configured to expand the light that propagates in the waveguide substrate, wherein at least one of the input grating coupler and the expansion grating coupler includes one or more variable index grating elements, and the variable index grating elements are formed vertically on a surface of the waveguide substrate, and each of the variable index grating elements has a variable index that is decreased exponentially toward the surface of the waveguide substrate.

2. The waveguide of claim 1, wherein the variable index grating elements are formed vertically on a surface of the waveguide substrate.

3. The waveguide of claim 1, wherein the variable index grating elements are formed in a constant pitch structure.

* * * * *